(12) United States Patent
Kimura

(10) Patent No.: US 6,343,202 B1
(45) Date of Patent: Jan. 29, 2002

(54) IMAGE FORMING APPARATUS FOR CORRECTING IMAGE FORMATION TIMING OF PLURAL IMAGE FORMING UNITS

(75) Inventor: Kuniyasu Kimura, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,319

(22) Filed: May 24, 2000

(30) Foreign Application Priority Data

May 28, 1999 (JP) ............................................. 11-149591

(51) Int. Cl.$^7$ .............................................. G03G 15/01
(52) U.S. Cl. ....................................................... 399/301
(58) Field of Search ................................. 399/301, 303

(56) References Cited

U.S. PATENT DOCUMENTS

| | | | | |
|---|---|---|---|---|
| 5,325,154 A | * | 6/1994 | Tayama et al. | 399/301 |
| 5,715,498 A | * | 2/1998 | Takeuchi et al. | 399/301 X |
| 5,819,140 A | * | 10/1998 | Iseki et al. | 399/303 X |
| 5,974,282 A | * | 10/1999 | Yamada | 399/303 X |
| 6,049,690 A | * | 4/2000 | Nakayasu et al. | 399/301 |
| 6,101,359 A | * | 8/2000 | Tamura | 399/301 |
| 6,118,463 A | * | 9/2000 | Houki et al. | 399/301 |

* cited by examiner

Primary Examiner—Fred L Braun
(74) Attorney, Agent, or Firm—Fitzpatrick, Cella, Harper & Scinto

(57) ABSTRACT

An image forming apparatus includes a plurality of image forming units, an endless moving member for mounting and carrying a recording material so as to transfer each image formed by a corresponding one of the plurality of image forming units at a transfer position, a detection circuit for detecting the recording material on the endless moving member, and a correction circuit for correcting an image forming timing of each corresponding one of the plurality of image forming units based on a detection output of the detection circuit. Each image forming unit has a delay unit that delays input image data and an image forming unit that forms an image based on the image data output from the delay unit. The correction circuit corrects the timing of an image forming, operation by controlling the delay time of the delay unit. The endless moving member can convey recording materials of plural sizes and the correction circuit controls the timing of tile image forming operation of each image forming unit according to the size of the recording material conveyed by said endless moving member and/or detected unevenness of thickness of the timing belt of the endless moving member.

22 Claims, 9 Drawing Sheets

| | (A) | | (B) | (C) | | (D) | | | | (E) | | | (F) | | |
|---|---|---|---|---|---|---|---|---|---|---|---|---|---|---|---|
| REGION | THICKNESS t (μm) | DIFFERENCE Δt (μm) | VARIATION IN SPEED Δv (μm/s) | AMOUNT OF POSITION DEVIATION L (μm) | ACCUMULATED AMOUNT OF POSITION DEVIATION ΔL (μm) | AMOUNT OF POSITION DEVIATION (μm) | | | | AMOUNT OF CORRECTION WITH REFERENCE TO K (μm) | | | AMOUNT OF CORRECTION IN UNITS OF 1/16 LINE | | |
| | | | | | | Y | M | C | K | Y | M | C | Y | M | C |
| 1 | 76.2 | -1.7 | -12.8 | -14.1 | -14.4 | 3.1 | 10.3 | 14.5 | 15.8 | -12.7 | -5.5 | -1.3 | -5 | -2 | 0 |
| 2 | 79.6 | 0.0 | 0.2 | 0.3 | -13.9 | 12.5 | 15.4 | 15.2 | 12.8 | -0.4 | 2.5 | 2.4 | 0 | 1 | 1 |
| 3 | 86.2 | 3.3 | 25.5 | 28.2 | 14.3 | 16.3 | 14.7 | 11.7 | 7.3 | 9.0 | 7.4 | 4.4 | 3 | 3 | 2 |
| 4 | 81.2 | 1.0 | 7.5 | 8.3 | 22.7 | 13.7 | 10.7 | 5.5 | 0.1 | 13.6 | 10.6 | 5.4 | 5 | 4 | 2 |
| 5 | 77.5 | -1.0 | -7.8 | -8.6 | 14.0 | 8.7 | 4.0 | -2.2 | -5.0 | 13.7 | 9.0 | 2.9 | 5 | 3 | 1 |
| 6 | 79.2 | -0.2 | -1.3 | -1.4 | 12.6 | 1.9 | -3.8 | -5.5 | -2.9 | 4.7 | -0.9 | -2.6 | 2 | 0 | -1 |
| 7 | 79.2 | -0.2 | -1.3 | -1.4 | 11.2 | -4.7 | -5.6 | -0.6 | 5.3 | -10.0 | -10.9 | -5.9 | -4 | -4 | -2 |
| 8 | 76.9 | -1.3 | -10.1 | -11.2 | 0.0 | -4.6 | 1.1 | 8.2 | 13.3 | -18.0 | -12.2 | -5.2 | -7 | -5 | -2 |

AVERAGE = 79.538

FIG.8

|   | 1 | 2 | 3 | 4 | 5 |
|---|---|---|---|---|---|

| | | | | | |
|---|---|---|---|---|---|
| Y TRANSFER | | | | | |
| Y TRANSFER | | | | | |
| RATE OF CONTRIBUTION | 1.000 | 1.000 | 1.000 | 0.302 | 0.000 |
| RATE OF CONTRIBUTION | 0.000 | 1.000 | 1.000 | 1.000 | 0.302 |
| AVERAGE CONTRIBUTION | 0.500 | 1.000 | 1.000 | 0.651 | 0.151 |

AMOUNT OF DEVIATION OF Y FROM IDEAL POSITION IS
$(\Delta L1 \times 0.5 + \Delta L2 \times 1 + \Delta L3 \times 1 + \Delta L4 \times 0.651 + \Delta L5 \times 0.151) / 3.302 = 3.1$

FIG.9

IMAGE FORMING APPARATUS FOR CORRECTING IMAGE FORMATION TIMING OF PLURAL IMAGE FORMING UNITS

BACKGROUND OF THE INVENTION

1. Field of the Invention

The present invention relates to an image forming apparatus, and more particularly, to an apparatus for forming an image by a plurality of image forming means.

2. Description of the Related Art

Apparatuses for obtaining a color image by forming images of different colors on corresponding ones of a plurality of photosensitive drums using a laser beam or LEDs (light-emitting diodes), and transferring these images onto a common recording material conveyed by a transfer belt are known.

Since the thickness of an endless moving member, such as a transfer belt, or the like, for conveying a recording sheet is generally uneven, the surface speed of the belt at a contact point between the belt and a belt driving roller is also uneven. As a result, the conveying speed of the recording material at a transfer position of each image forming unit varies, thereby causing position deviation among images of respective colors.

SUMMARY OF THE INVENTION

It is an object of the present invention to solve the above-described problems.

It is another object of the present invention to obtain an excellent image by preventing position deviation among respective images constituting the image when forming the respective images on a recording sheet conveyed by an endless moving member.

It is still another object of the present invention to obtain a very precise image at a high speed.

According to one aspect, the present invention which achieves these objectives relates to an image forming apparatus including a plurality of image forming means, an endless moving member for mounting and carrying a recording material so as to transfer each image formed by a corresponding one of the plurality of image forming means at a transfer position, position detection means for detecting a mounted position of the recording material on the endless moving member, and correction means for correcting an image forming timing of the corresponding one of the plurality of image forming means based on a detection output of the position detection means.

According to another aspect, the present invention which achieves these objectives relates to an image forming apparatus including a plurality of image forming means, an endless moving member for mounting and conveying a recording material so as to transfer each image formed by a corresponding one of the plurality of image forming means at a transfer position, first detection means for detecting a predetermined reference position of the endless moving member, second detection means for detecting the recording material at a conveyance start position, and correction means for correcting an image forming timing of the corresponding one of the plurality of image forming means based on a time period until an output from the second detection means is obtained after an output of the first detection means has been obtained.

According to still another aspect, the present invention which achieves these objectives relates to an image forming apparatus including a plurality of image forming means, an endless moving member for mounting a recording material and conveying the recording material from a first position to a second position so as to transfer each image formed by a corresponding one of the plurality of image forming means onto a recording material at a transfer position, driving means for performing driving for conveying the endless moving member, and detection means for detecting a state of conveyance of the recording material at the first position. A driving position of the endless moving member by the driving means is detected in accordance with a detection output of the detection means, and an image forming timing of the corresponding one of the plurality of image forming means is corrected based on the driving position.

The foregoing and other objects, advantages and features of the present invention will become more apparent from the following detailed description of the preferred embodiment taken in conjunction with the accompanying drawings.

BRIEF DESCRIPTION OF THE DRAWINGS

FIG. 8 is a table illustrating amounts of timing correction in the embodiment; and FIGS. 9 and 10 are diagrams illustrating how amounts of timing correction shown in FIG. 8 are obtained.

DETAILED DESCRIPTION OF THE PREFERRED EMBODIMENT

A preferred embodiment of the present invention will now be described in detail with reference to the drawings.

Figure 1:
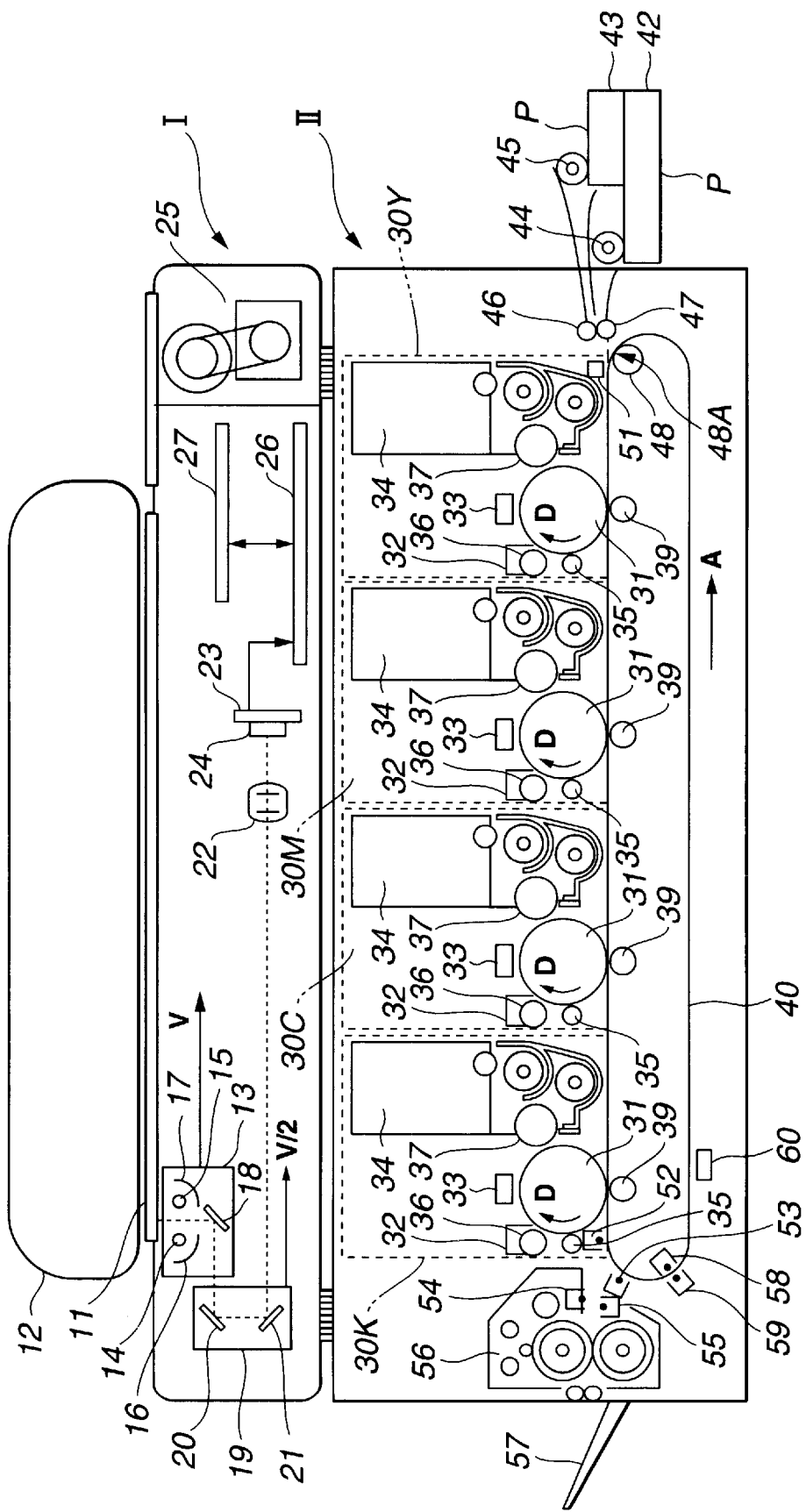
FIG. 1 is a diagram illustrating the configuration of an image forming apparatus according to an embodiment of the present invention.

FIG. 1 is a diagram illustrating the configuration of an image forming apparatus according to the preferred embodiment.

An apparatus shown in FIG. 1 includes a color reader unit I and a color printer unit II.

First, the color reader unit I will be described.

In FIG. 1, original-mount glass (platen) 11 is horizontally provided at an upper portion of the color reader unit I, and a document feeder (DF) 12 for feeding an original is provided above the original-mount glass 11. Light sources 14 and 15, each comprising a tungsten halogen lamp, reflectors 16 and 17 for condensing light beams from the light sources 14 and 15, respectively, onto an original, and a mirror 18 for reflecting reflected light or projected light from the original are mounted within a first carriage 13. Mirrors 20 and 21 for condensing reflected light from the mirror 18 onto a CCD (charge-coupled device) 24 are mounted within a second carriage 19.

There are also shown a substrate 23 mounting the CCD 24, an image processing unit 26, and an interface unit 27, serving as an interface with other apparatuses.

The first carriage 13 and the second carriage 19 are mechanically driven by a driving mechanism 25 so as to scan the entire surface of the original at speeds V and 1/2 V, respectively, in a direction perpendicular to the scanning direction of the CCD 24.

Next, the image processing unit 26 will be described.

Figure 2:
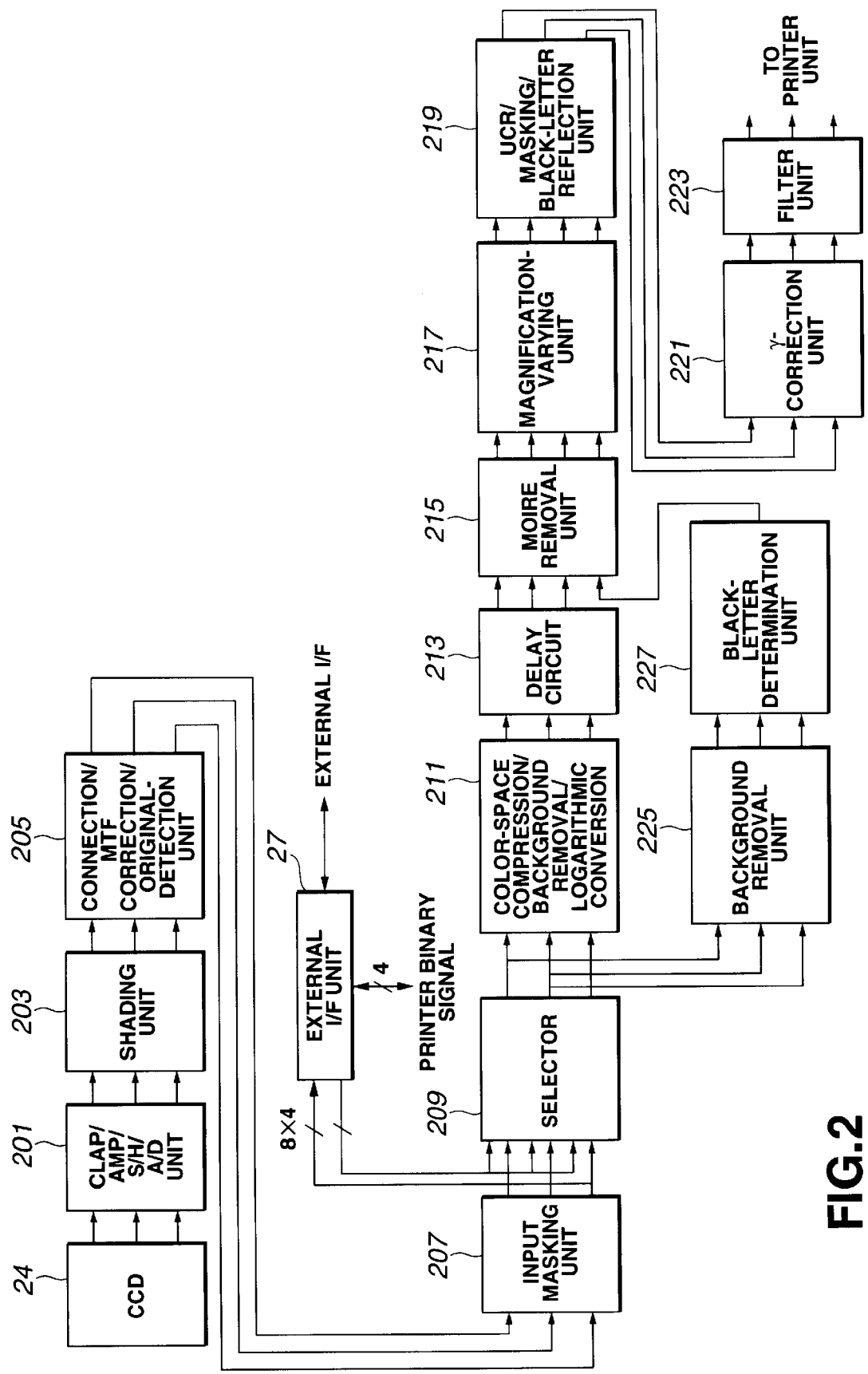
FIG. 2 is a block diagram illustrating the configuration of an image processing circuit shown in FIG. 1.

FIG. 2 is a block diagram illustrating the configuration of the image processing unit 26.

In FIG. 2, the original on the original-mount glass 11 reflects light from the light sources 14 and 15, and the reflected light is converted into electrical signals by the CCD 24. When the CCD 24 operates as a color sensor, it may comprise a one-line CCD on which R, G and B color filters are sequentially arranged in this order, or a 3-line CCD on which R, G and B filters are arranged for respective lines. The filters may have an on-chip configuration, or may be configured separately from the CCD 24.

The electrical signals from the CCD 24 are subjected to sample holding by a clamp/amp/S/H(sample-and-hold)/A/D (analog-to-digital conversion) unit 201, clamped by making the dark level of the analog image signal a reference potential, amplified with a predetermined gain, subjected to A/D conversion, and are converted into digital signals comprising 8 bits for each of R, G and B samples.

The R, G and B signals are subjected to shading correction and black correction by a shading unit 203, and are output to a connection/MTF correction/original-detection unit 205. When the CCD 24 is a 3-line CCD, since reading positions differs depending on lines, the unit 205 adjusts the amount of delay for each line in accordance with the reading speed, in order to adjust a timing for each signal so that the same reading position is provided for three lines. Since MTF of reading changes depending on the reading speed, varying magnification, or the like, the unit 205 also corrects variations and recognizes the size of the original on the original-mount glass platen 11.

The image signals where reading-position timings have been corrected are corrected by an input masking unit 207 with respect to the spectral characteristics of the CCD 24, the light sources 14 and 15, and the reflectors 16 and 17. Outputs from the input masking unit 207 are input to a selector 209 which can be switched to external I/F signals.

Signals output from the selector 209 are input to a color-space compression/background removal/logarithmic conversion unit (hereinafter abbreviated as a "logarithmic conversion unit") 211 and a background removal unit 225. Backgrounds are removed from the signals input to the background removal unit 225. Then, the signals are input to a black-letter determination unit 227 for determining if the letter represented by the signals is a black letter in the original, and a black-letter signal is generated from the original.

The logarithmic conversion unit 211 determines if the color space represented by the read image signals is within a range reproducible by the image forming apparatus of the embodiment. If the result of the determination is affirmative, no correction is performed. If the result of the determination is negative, correction is performed so that the color space represented by the image signals enters the reproducible range. Then, backgrounds are removed, and R, G and B signals are converted into C, M and Y signals by performing logarithmic conversion.

In order to correct timings with respect to the signal generated by the black-letter determination unit 227, the timings of outputs of the logarithmic conversion unit 211 are adjusted by a delay circuit 213. Moiré patterns are removed from signals from the delay circuits 213 and the black-letter determination unit 227. Then, the signals are subjected to magnification varying processing in the main scanning direction by a magnification varying unit 217.

UCR/masking/black-letter reflection unit (hereinafter abbreviated as a "UCR unit") 219 generates C, M, Y and K signals from C, M and Y signals by performing UCR processing for the signals processed by the magnification varying unit 217, and corrects the signals so as to be adapted as output of an image forming unit by performing masking processing. At the same time, a determination signal generated by the black-letter determination unit 227 is subjected to feedback to the C, M, Y and K signals.

The signals processed by the UCR unit 219 are subjected to density adjustment by a I-correction unit 221, then subjected to smoothing or edge processing by a filter unit 223, and are output to the color printer unit II.

Next, the color printer unit II will be described.

The image forming apparatus of the embodiment has four photosensitive drums for forming images of four colors, i.e., yellow Y, magenta M, cyan C and black K.

In FIG. 1, each of a Y-image forming unit 30Y, an M-image forming unit 30M, a C-image forming unit 30C, and a K-image forming unit 30K includes a photosensitive drum 31, a charger 32, an LED unit 33, a developing unit 34 and an auxiliary charger 35. The charger 32 includes a charging sleeve 36, and the developing unit 34 includes a developing sleeve 37.

Although a description will now be provided of the Y-image forming unit 30Y, image forming units for other colors have the same configuration.

The Y-image forming unit 30Y includes the photosensitive drum 31, and the charger 32, the LED unit 33, the developing unit 34, and the auxiliary charger 35 are arranged around the photosensitive drum 31.

When forming an image, the auxiliary charger 35 and the charger 32 charge the photosensitive drum 31. By causing the charging sleeve 36 to rotate in a direction opposite to the rotational direction D of the photosensitive drum 31, the charger 32 forms a dielectric brush by a low-resistance ferrite carrier (not shown), to uniformly charge the surface of the photosensitive drum 31 and prepare for formation of a latent image.

A latent image is formed on the photosensitive drum 31 by light from the LED unit 33, and a toner image is formed by developing the latent image using the developing unit 34. The developing unit 34 includes the developing sleeve 37 for developing the latent image by applying a developing bias voltage. A transfer charger 39 is disposed below the photosensitive drum 31 via a conductive transfer belt 40. Discharging is performed from the back of the transfer belt 40, in order to transfer the toner image on the photosensitive drum 31 onto a recording material, such as recording paper, or the like, mounted on the transfer belt 40 moving in the direction of arrow A.

After the transfer of the toner image, toner particles remaining on the photosensitive drum 31 are received in the charger 32, and are then returned onto the photosensitive drum 31 in a state in which electrostatic characteristics are changed. The developing unit 34 collects the toner particles in order to again utilize them.

Next, the operation relating to conveyance of a recording material, such as recording paper, or the like, and image transfer will be described.

Recording sheets accommodated in a cassette 42 or 43 are individually fed to sheet feeding rollers 46 and 47 by a pickup roller 44 or 45, respectively, and the fed sheet is supplied onto the transfer belt 40 by the sheet feeding rollers 46 and 47. The transfer roller 40 is driven by a transfer-belt roller 48 in the direction of arrow A, so as to convey the mounted recording sheet to the Y-image forming unit 30Y, the M-image forming unit 30M, the C-image forming unit 30C, and the K-image forming unit 30K in this sequence, and transfer corresponding images onto the recording sheet at respective transfer positions.

After removing charges on the recording sheet passing through the K-image forming unit 30K by a charge removing charger 52 so as to facilitate separation of the recording sheet from the transfer belt 40, the recording sheet is separated from the transfer belt 40. A peeling charger 53 is provided at a position adjacent to the charge removing charger 52, in order to prevent disturbance in the image due to peeling discharge generated when the recording sheet is separated from the transfer belt 40.

In order to prevent disturbance in the image by supplementing the attracting force of the toner, the separated recording sheet is charged by prefixing chargers 54 and 55. Then, the toner image on the recording sheet is subjected to thermal fixing by a fixing unit 56, and the recording sheet is discharged onto a discharged-sheet tray 57. Charges on the transfer belt 40 are removed by an inside charge remover 58 and an outside charge remover 59.

Next, image forming processing by the LED unit 33 will be described.

Figure 3:
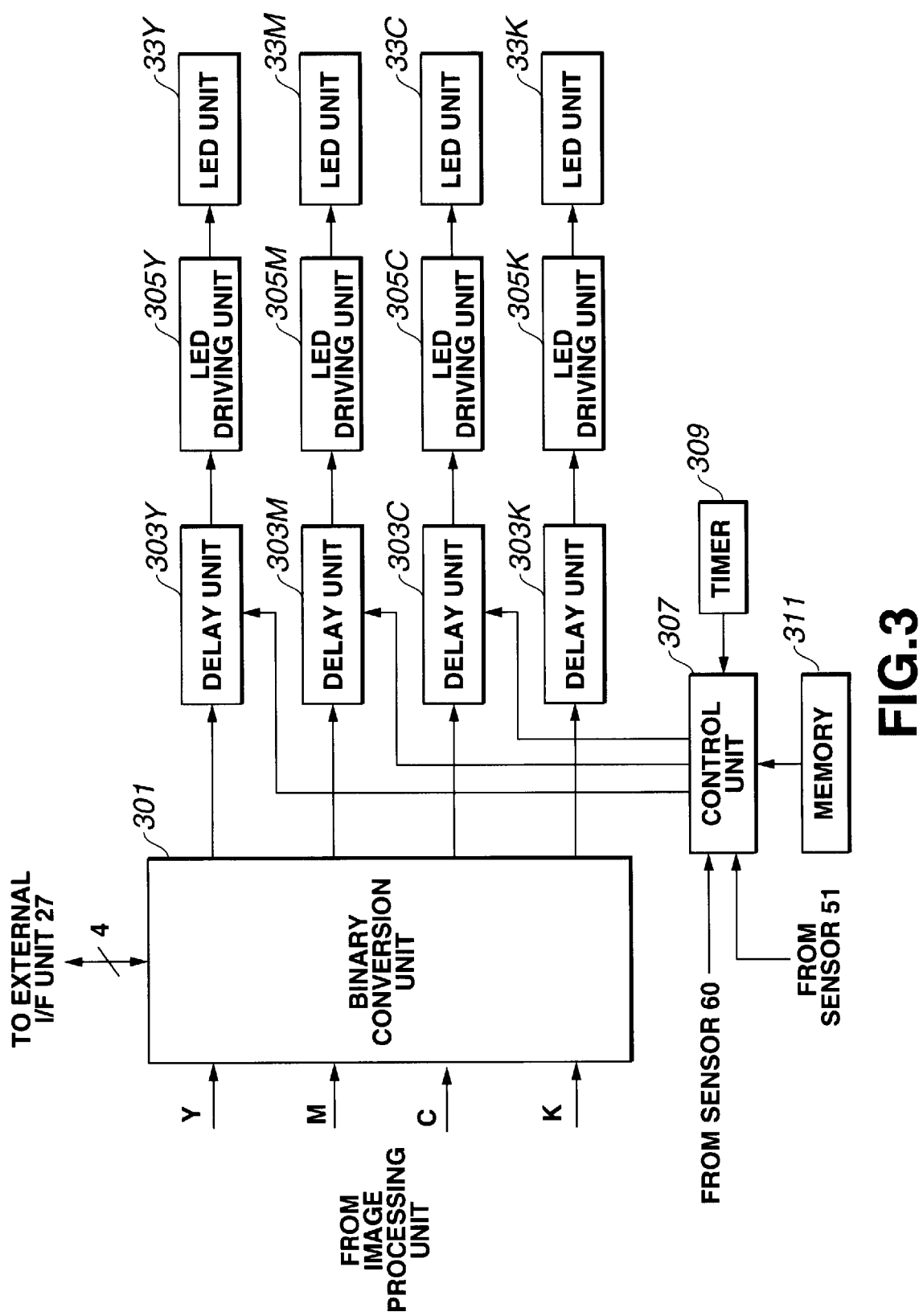
FIG. 3 is a block diagram illustrating the configuration of an LED driver shown in FIG. 1.

FIG. 3 is a diagram illustrating the configuration of an LED driver (not shown) in the color printer unit II.

The Y, M, C and K image signals, comprising 8 bits for each sample, output from the filter unit 223 shown in FIG. 2 are converted into binary signals, comprising 1 bit for each sample, by a binary conversion unit 301, and are input to delay units 303Y, 303M, 303C and 303K, respectively. Each of the delay units 303Y–303K comprises a FIFO (first-in first-out) memory. The delay units 303Y, 303M, 303C and 303K output the Y, M, C and K image signals after delaying them. In this embodiment, a control unit 307 controls respective delay times of the delay units 303Y–303K.

That is, the control unit 307 controls timings of reading image data from the delay units 303Y–303K after a detection pulse from a sheet-leading-edge sensor 51 has been input, and adjusts the timings of reading image data from the delay units 303Y, 303M and 303C in accordance with respective timing correction data obtained in a manner to be described later.

The image data output from the delay units 303Y, 303M, 303C and 303K are input to LED driving units 305Y, 305M, 305C and 305K, respectively. Each of the LED driving units 305Y–305K includes a plurality of shift registers for latching and holding input image data for a predetermined number of image data (pixels). At a timing such that image data for one line is held in corresponding ones of the shift registers, the LED units 33Y–33K are lit by being driven based on the held image data.

Figure 4:
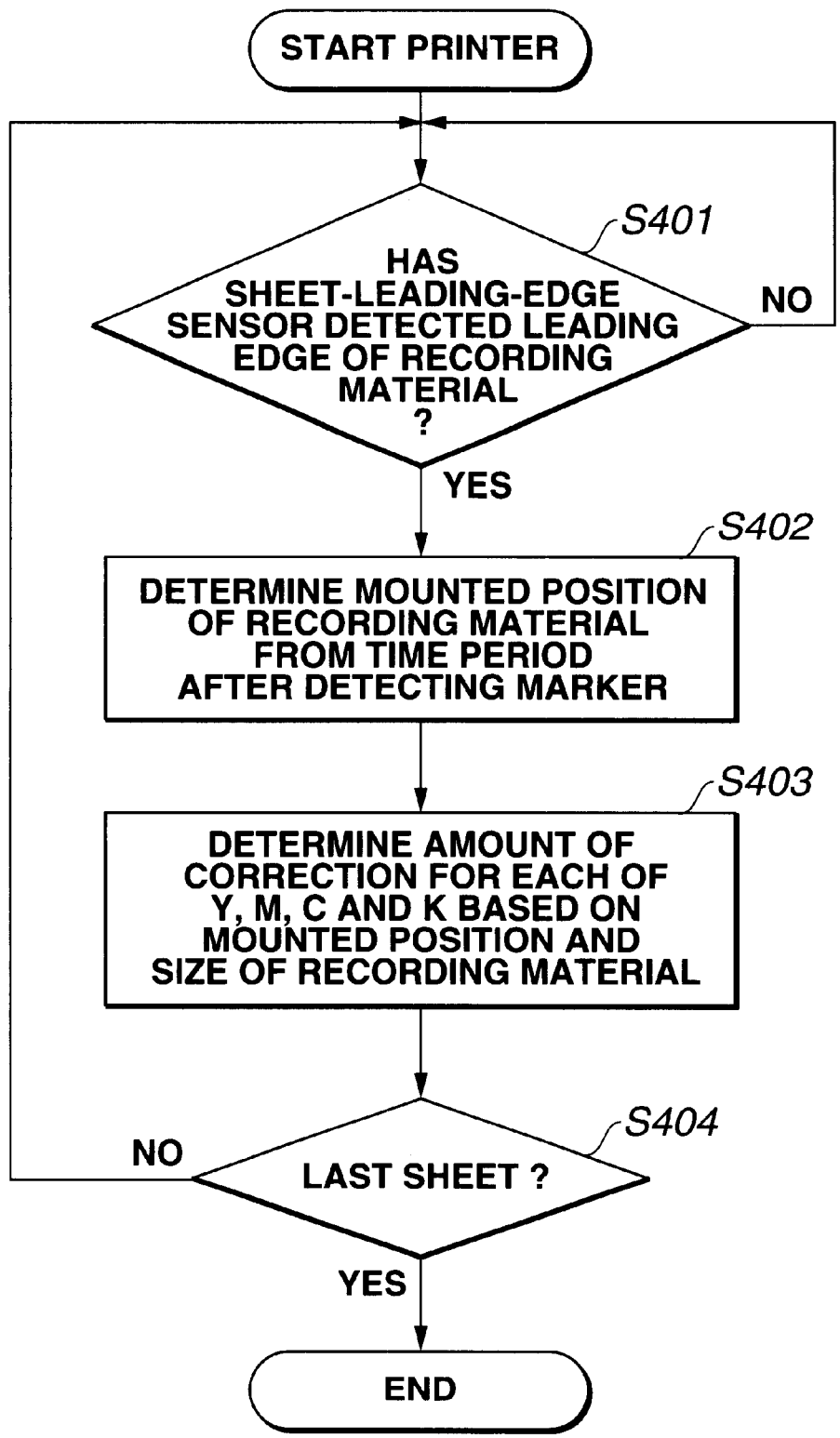
FIG. 4 is a flowchart illustrating an operation of the apparatus shown in FIG. 1.

Next, control of recording timings by the control unit 307 will be described with reference to the flowchart shown in FIG. 4.

Figure 5:
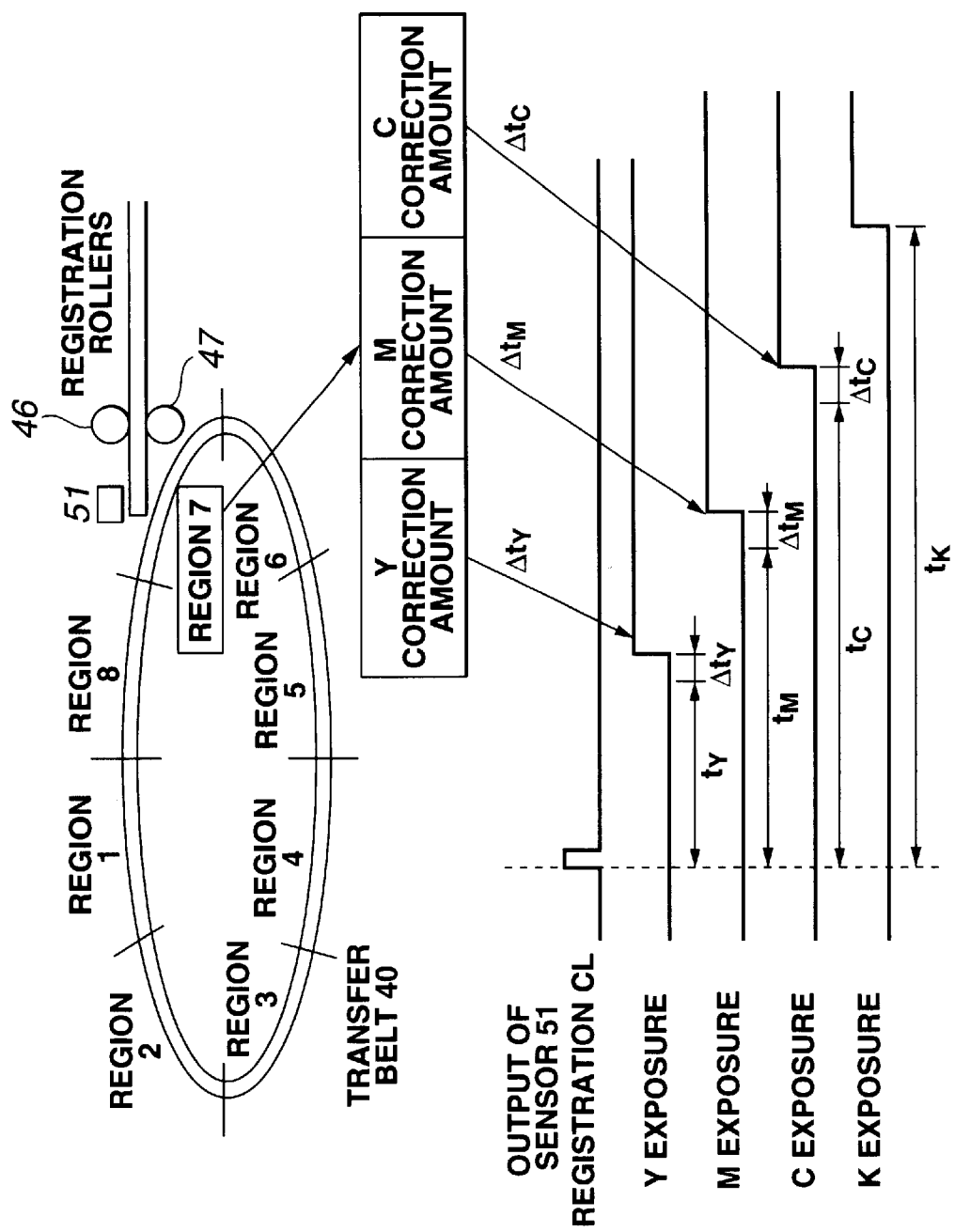
FIG. 5 is a diagram illustrating how exposure timings are controlled in the apparatus shown in FIG. 1.

In this embodiment, as shown in FIG. 5, the transfer belt 40 is divided into 8 regions in the moving direction thereof. A driving region of the transfer belt 40 by the transfer-belt roller 48 during transfer of a Y image is detected in accordance with the position where the recording sheet is mounted, and a recording timing for an image of each color is corrected.

In FIG. 5, tY, tM and tC indicate delay times for image data by the delay units 303Y, 303M and 303C, respectively, after a detection pulse of the sheet-leading-edge sensor 51 has been input, when there is no unevenness in the speed of the transfer belt 40. The control unit 307 outputs image data by correcting the delay times of the delay units 303Y, 303M and 303C by periods $\Delta tY$, $\Delta tM$ and $\Delta tC$ for the delay times tY, tM and tC, respectively.

Figure 6:
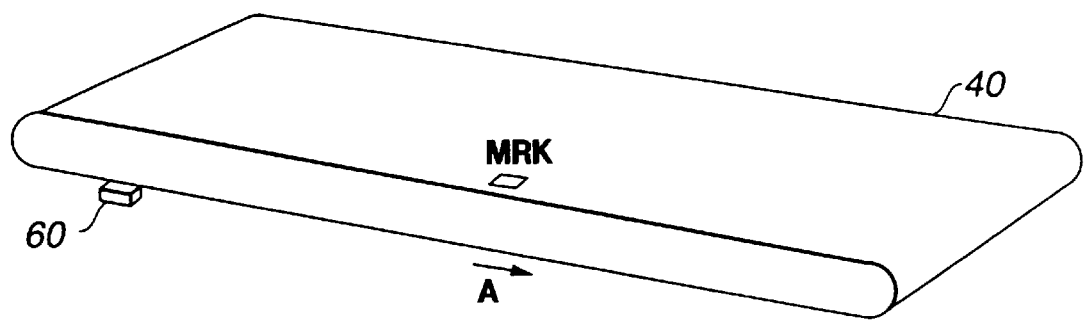
FIG. 6 is a perspective view illustrating a home-position mark on a transfer belt.

That is, when the sheet-leading-edge sensor 51 provided immediately before the image forming unit 30Y has detected the leading edge of the recording sheet (step S401), a time elapsed until an output pulse of the sheet-leading-edge sensor 51 is obtained after a sensor 60 for detecting a home-position mark MRK, provided on the transfer belt 40 as shown in FIG. 6, has detected the mark is measured. The control unit 307 resets the value of the timer 309 every time a detection pulse of the mark MRK output from the sensor 60. The value of the timer 309 when the output pulse of the sensor 51 is obtained indicates a time elapsed until a detection pulse of the sheet-leading-edge sensor 51 is obtained after the sensor 60 has detected the mark MRK.

The mounted position of the recording sheet on the transfer belt 40 is determined from this elapsed time (step S402).

Then, an amount of timing correction stored in a memory 311 is read based on the detected mounted position of the recording sheet, i.e., a value of the timer 309, and the size of the recording sheet, and delay times of the delay units 303Y–303C are corrected based on the amount of timing correction (step S403). If the recording sheet is the last sheet, the process is terminated. If the next recording sheet is present, the process returns to step S401.

Next, a description will be provided of the operation of setting the amount of correction of a timing to start recording in the embodiment. Unevenness in the thickness of the transfer belt 40 differs for each belt. Hence, in this embodiment, unevenness in the thickness of a belt is measured in advance, for example, when shipping the belt from a factory. Amounts of correction of recording timings in the sub-scanning direction for colors Y, M and C are calculated so as to minimize the average amount of position deviation of colors Y, M and C with respect to color K within the page of the recording material, based on the unevenness in the thickness, and the calculated amounts are stored in the memory 311.

Figure 7:
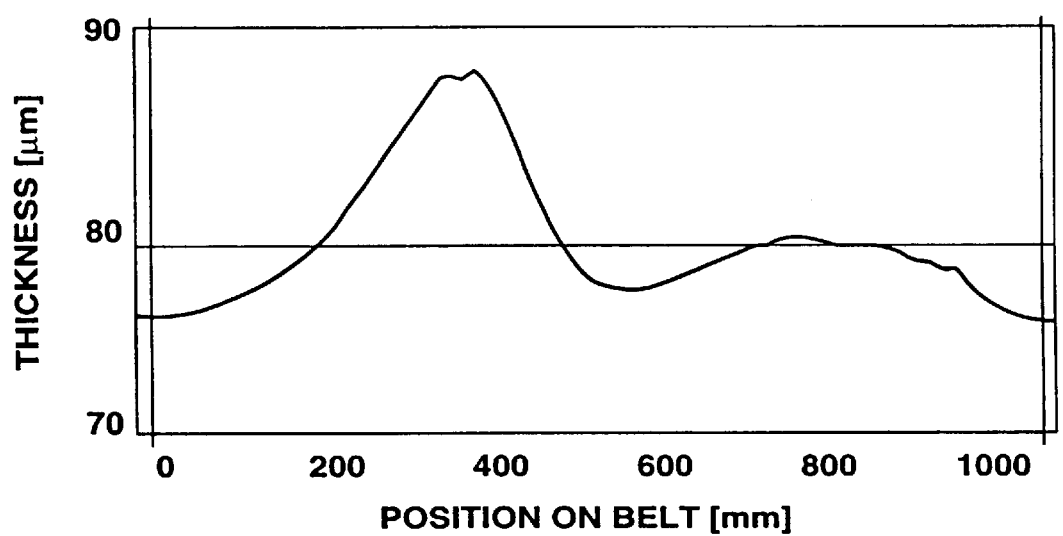
FIG. 7 is a graph illustrating unevenness in the thickness of the transfer belt.

First, data of differences in the thickness of the belt at three points, i.e., front, intermediate and rear points, with an interval of 1 mm are measured. FIG. 7 illustrates an example of plotting the mean values of respective three points. In this embodiment, as described above, the transfer belt 40 is divided into 8 regions, and the mean value of data of the differences in the thickness at each region is used as the data of the thickness of the region. In FIG. 8, column (A) indicates the data of the difference $\Delta t$ of the thickness data t of each region from the total mean value. Since the transfer speed is determined by the driving radius of the neutral surface of the belt, the value $\Delta t$ is half the difference from the mean value.

If variations in the speed when the belt driving roller drives a region are represented by unevenness in the speed $\Delta v$, the value $\Delta v$ is expressed by:

$$\Delta v = \Delta t / r \times Ps \qquad (1),$$

where Ps is a reference running speed of the belt (column (B) in FIG. 8).

The amount of position deviation L produced when the recording sheet passes through one region due to variations in the speed is expressed by:

$$L = \Delta v \times T1 \quad (2),$$

where T1 is a time of passage through one region. In consideration of influence of position deviation from the first region on the entire belt, the accumulated amount of position deviation ΔL is as shown in column (C) in FIG. 8. The accumulated amount of position deviation as a characteristic of the belt is determined by the data of the differences of the thickness of the belt and fixed parameters of image forming conditions.

Since the influence of the belt on the recording sheet differs depending on the size of the sheet and the mounted position of the sheet on the belt, the amount of position deviation of each color must be individually obtained using the size of the sheet and the mounted position of the sheet as parameters. In this embodiment, a case in which an A3-size sheet is used, and region 1 of the transfer belt 40 is driven while contacting the driving roller 48 at position 48A during transfer of a Y image onto the recording sheet will be described.

Even if the same region 1 is driven, the influence of the belt on the recording sheet differs depending on the driving position when starting the transfer of the Y image. In this embodiment, the mean value of cases in which the leading end and the rear end of region 1 are driven is made a representative value of position deviation of the sheet at that region.

Consider a case of a Y image with reference to FIG. 9. In this embodiment, it is assumed that the length of the transfer belt is 1,018 mm, and the length of one region is 127.25 mm which corresponds to ⅛ of the length of the transfer belt. The length of an A3-size sheet equals the length of 3.3 regions. Hence, when the transfer belt is driven from the leading end of region 1 during transfer of the Y image, the rates of contribution of regions 1, 2, 3, 4 and 5 are 1.0, 1.0, 1.0, 0.3 and 0.0, respectively. When the transfer belt is driven from the read end, the rates of contribution are 0.0. 1.0, 1.0, 1.0 and 0.3. The mean values of the two rates of contribution are 0.5, 1.0, 1.0, 0.651 and 0.151. A value obtained by multiplying the accumulated amount of position deviation by the rate of contribution and dividing the resultant value by the number of regions per page 3.3 is the average amount of position deviation within the page of the Y image when region 1 is driven during transfer of the Y image.

Figure 10:
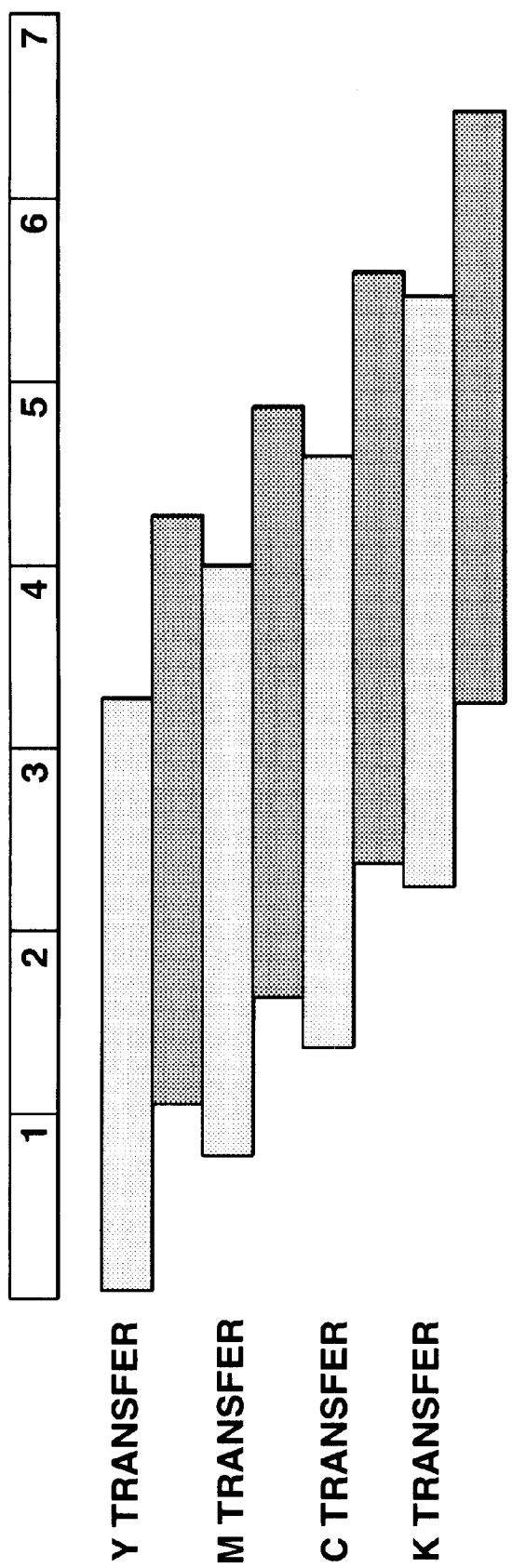

As for other colors, as shown in FIG. 10, the rate of contribution of each region is obtained by shifting the driving position based on the distance between the drum of the Y image and the image of the subject color, and the average amount of position deviation within the page of the color when region 1 is driven during transfer of the Y image is obtained. The amount of position deviation of each color in each region obtained in the above-described manner is shown in column (D) of FIG. 8.

In this embodiment, by making K a reference color, and adjusting the position deviation of each of Y, M and C images with the amount of deviation of K, position deviation among respective colors is corrected. The amount of correction of each of Y, M and C images making K a reference is shown in column (E) of FIG. 8. In this embodiment, it is assumed that a recording timing by the LED unit 33 is provided in units of 1/16 line. The amount of correction of each of Y, M and C images in units of 1/16 line is shown in column (F) of FIG. 8. The data indicated in column (F) of FIG. 8 is written in the memory 311 shown in FIG. 3 as a table.

The distance from the position of the sensor 51 to the transfer position of the Y image by the Y-image forming unit 30Y is known in advance. Hence, by performing predetermined calculation using the value of the timer 309 when an output pulse of the sensor 51 is input and the above-described reference-running speed Ps of the belt, the driving region of the transfer belt 40 by the driving roller 48 when starting transfer of the Y image can be obtained.

When performing printing on an A3-size sheet, the control unit 307 calculates the driving region of the transfer belt 40 by the driving roller 48 during transfer of the Y image onto the sheet, based on the mounted position of the sheet detected in the above-described manner, adjusts the delay time of the delay unit 305 based on the amount of correction corresponding to the driving region, and corrects the timing to start recording of each image.

Such correction may also be performed for any other sheet size. The region and the amount of correction for each size are written in the table of the amount of correction.

As described above, according to this embodiment, since the amount of position deviation of an image of each color due to unevenness in the thickness of the belt is stored in memory, and the recording timing for the image of each color is corrected based on the mounted position of the recording sheet during image formation, it is possible to correct position deviation among images of respective colors due to unevenness in the thickness of the belt, and to obtain an excellent image.

In this embodiment, since the transfer belt is divided into 8 regions in the moving direction, data of correction of position deviation is obtained for each region, and the recording timing is corrected by detecting the position of the transfer belt 40 driven by the driving roller 48 during transfer of a Y image onto a recording sheet for each region based on the mounted position of the recording sheet during image formation, it is possible to very easily correct position deviation among images of respective colors.

Although in this embodiment a timer 309 is used for detecting the mounted position of the recording sheet during image formation, a counter for counting clock pulses having a predetermined frequency may be used.

Although in this embodiment the transfer belt is divided into 8 regions, the transfer belt may also be divided into n (n being an integer equal to or larger than 2) regions, each having a plurality of thickness measuring points, and data of correction of position deviation may be obtained for each region.

Although in this embodiment the position of the recording sheet on the transfer belt is obtained from the time period until the sheet-leading-edge sensor 51 detects the recording sheet after the sensor 60 has detected the mark M, a plurality of home-position sensors may be provided, and the mark M may be detected by each sensor.

Although in this embodiment an image is formed using LEDs, the present invention may also be applied to an apparatus for forming an image using a laser beam, and the same effects as in this embodiment may be provided.

The individual components shown in outline or designated by blocks in the drawings are all well known in the image forming apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus, comprising:
   a plurality of image forming means;
   an endless moving member for conveying a recording material mounted thereon so as to permit transfer of each image formed by a corresponding one of said plurality of image forming means at a transfer position;
   position detection means for detecting a position at which the recording material is mounted on said endless moving member; and
   correction means for correcting a timing of an image forming operation of a corresponding one of said plurality of image forming means based on a detection output of said position detection means,
   wherein each of said plurality of image forming means comprises a delay unit for delaying input image data, and an image forming unit for forming an image based on the image data output from said delay unit, and
   wherein said correction means corrects the timing of an image forming operation by controlling a delay time of said delay unit.

2. An apparatus according to claim 1, wherein said position detection means comprises first detection means for detecting a predetermined reference position of said endless moving member, and second detection means for detecting the recording material at a position to start conveyance, and wherein the position at which the recording material is mounted is detected based on a detection timing between an output of said first detection means and an output of said second detection means.

3. An apparatus according to claim 1, wherein said endless moving member can convey recording materials of a plurality of sizes, and wherein said correction means controls a timing of the image forming operation of each of said plurality of image forming means in accordance with a size of the recording material conveyed by said endless moving member.

4. An apparatus according to claim 3, wherein said correction means comprises a memory for storing an amount of timing correction corresponding to the size of the recording material, and controls the timing of an image forming operation based on the amount of timing correction stored in said memory.

5. An apparatus according to claim 4, wherein said endless moving member comprises a conductive transfer belt, and wherein the amount of timing correction is determined based on unevenness in a thickness of said transfer belt.

6. An apparatus according to claim 1, wherein said correction means controls timings for forming images of other colors with respect to an image of a predetermined reference color from among images formed by said plurality of image forming means.

7. An apparatus according to claim 1, further comprising:
   driving means for driving movement of said endless moving member, wherein said correction means detects a driving position of said endless moving member by said driving means based on the detection output of said position detection means, and controls the timing of an image forming operation in accordance with the driving position.

8. An apparatus according to claim 7, wherein said correction means divides said endless moving member into a plurality of areas in a conveying direction of said endless moving member, and detects the driving position in units of area.

9. An apparatus according to claim 7, wherein said correction means detects the driving position of said endless moving member by said driving means during transfer of an image formed by a predetermined image forming means onto the recording material.

10. An apparatus according to claim 1, wherein each of said plurality of image forming means comprises an image bearing member, and an exposure unit for forming an image on said image bearing member by exposing said image bearing member in accordance with image data, and wherein said correction means corrects the timing of an image forming operation by controlling a timing of exposure by said exposure unit.

11. An apparatus according to claim 10, wherein said correction means controls the timing of exposure by said exposure unit in units smaller than one line.

12. An apparatus according to claim 1, wherein said correction means comprises a memory for storing a plurality of correction values corresponding to mounted positions of the recording material, and selects a correction value stored in said memory in accordance with an output of said position detection means.

13. An image forming apparatus, comprising:
    a plurality of image forming means;
    an endless moving member for conveying a recording material mounted thereon so as to permit transfer of each image formed by a corresponding one of the plurality of image forming means at a transfer position;
    first detection means for detecting a predetermined reference position of said endless moving member;
    second detection means for detecting the recording material at a conveyance start position; and
    correction means for correcting a timing of an image forming operation of a corresponding one of said plurality of image filming means based on a time period until an output from said second detection means is obtained after an output of said first detection means has been obtained,
    wherein each of said plurality of image forming means comprises a delay unit for delaying input image data, and an image forming unit for forming an image based on the image data output from said delay unit, and
    wherein said correction means corrects the timing of an image forming operation by controlling a delay time of said delay unit.

14. An apparatus according to claim 13, wherein said endless moving member can convey recording materials of a plurality of sizes, and wherein said correction means controls a timing of an image forming operation of each of said plurality of image forming means in accordance with a size of the conveyed recording material.

15. An apparatus according to claim 14, wherein said correction means comprises a memory for storing an amount of timing correction corresponding to the size of the recording material, and controls the timing of an image forming operation based on the amount of timing correction stored in said memory.

16. An apparatus according to claim 15, wherein said endless moving member comprises a conductive transfer belt, and wherein the amount of timing correction is determined based on unevenness in a thickness of said transfer belt.

17. An apparatus according to claim 13, wherein said correction means controls timings for forming images of other colors with respect to an image of a predetermined reference color from among images formed by said plurality of image forming means.

18. An apparatus according to claim 13, further comprising:
   driving means for driving movement of said endless moving member, wherein said correction means detects a driving position of said endless moving member by said driving means based on the detection output of said first position detection means, and controls the timing of an image forming operation in accordance with the driving position.

19. An apparatus according to claim 18, wherein said correction means divides said endless moving member into a plurality of areas in a conveying direction of said endless moving member, and detects the driving position in units of area.

20. An apparatus according to claim 18, wherein said correction means detects the driving position of said endless moving member by s aid driving means during transfer of an image formed by a predetermined image forming, means onto the recording material.

21. An apparatus according to claim 13 wherein each of said plurality of image forming means comprises an image bearing member, and an exposure unit for forming an image on said image bearing member by exposing said image bearing member in accordance with image data, and wherein said correction means corrects the timing of an image forming operation by controlling a timing of exposure by said exposure unit.

22. An apparatus according to claim 21, wherein said correction means controls the timing of exposure by said exposure unit in units smaller than one line.

* * * * *

UNITED STATES PATENT AND TRADEMARK OFFICE
CERTIFICATE OF CORRECTION

PATENT NO. : 6,343,202 B1
DATED : January 29, 2002
INVENTOR(S) : Kuniyasu Kimura It is certified that error appears in the above-identified patent and that said Letters Patent is hereby corrected as shown below:

Title page,
Item [57], ABSTRACT,
Line 14, "forming," should read -- forming --.
Line 17, "tile" should read -- the --.

Column 4,
Line 15, "I-correction" should read -- $\gamma$-correction --.

Column 5,
Line 21, "prefixing" should read -- pre-fixing --.
Line 62, "thereof" should read -- thereof. --.

Column 7,
Line 30, "1/8of" should read -- 1/8 of --.

Column 10,
Line 34, "filming" should read -- forming --.

Column 12,
Line 1, "s aid" should read -- said --.
Line 4, "13" should read -- 13, --.

Signed and Sealed this

Ninth Day of July, 2002

*Attest:*

*Attesting Officer*

JAMES E. ROGAN
*Director of the United States Patent and Trademark Office*